United States Patent
Bayer et al.

(10) Patent No.: US 11,158,913 B2
(45) Date of Patent: Oct. 26, 2021

(54) BIPOLAR PLATE FOR AN ELECTROCHEMICAL DEVICE

(71) Applicant: ElringKlinger AG, Dettingen (DE)

(72) Inventors: Arno Bayer, Stuttgart (DE); Peter Stahl, Metzingen (DE); Juergen Kraft, Metzingen (DE)

(73) Assignee: ElringKlinger AG, Dettingen (DE)

( * ) Notice: Subject to any disclaimer, the term of this patent is extended or adjusted under 35 U.S.C. 154(b) by 108 days.

(21) Appl. No.: 16/740,826

(22) Filed: Jan. 13, 2020

(65) Prior Publication Data

US 2020/0152953 A1 May 14, 2020

Related U.S. Application Data

(63) Continuation of application No. PCT/EP2018/068571, filed on Jul. 9, 2018.

(30) Foreign Application Priority Data

Jul. 14, 2017 (DE) ..................... 10 2017 115 873.1

(51) Int. Cl.
*H01M 50/54* (2021.01)
*H01M 4/86* (2006.01)
(Continued)

(52) U.S. Cl.
CPC ............. *H01M 50/54* (2021.01); *H01M 4/86* (2013.01); *H01M 8/0258* (2013.01);
(Continued)

(58) Field of Classification Search
CPC ...... H01M 50/54; H01M 4/86; H01M 8/0258; H01M 8/0267; H01M 8/0273;
(Continued)

(56) References Cited

U.S. PATENT DOCUMENTS

2008/0206617 A1   8/2008   Okada et al.
2012/0107713 A1   5/2012   Miller et al.
(Continued)

FOREIGN PATENT DOCUMENTS

DE    10 2013 220 486    4/2014

*Primary Examiner* — Stewart A Fraser
(74) *Attorney, Agent, or Firm* — Womble Bond Dickinson (US) LLP

(57) ABSTRACT

A bipolar plate for an electrochemical device, including a first bipolar plate layer and a second bipolar plate layer joined by a weld seam arrangement, wherein the first bipolar plate layer has a first and a second medium passage opening. The weld seam arrangement includes a first and a second medium channel weld seam, and a connecting weld seam which crosses the first and the second medium channel weld seams. Either a) the connecting weld seam is produced by a welding energy source which the first bipolar plate layer faced during the welding process, and the weld seam end of the connecting weld seam lies within the medium-conducting region of the bipolar plate which is surrounded by the first medium channel weld seam, and/or b) the connecting weld seam crosses the first medium channel weld seam and/or the second medium channel weld seam at least twice in each case.

14 Claims, 3 Drawing Sheets

(51) Int. Cl.
    *H01M 8/0258*    (2016.01)
    *H01M 8/0267*    (2016.01)
    *H01M 8/0273*    (2016.01)
    *H01M 8/0286*    (2016.01)

(52) U.S. Cl.
    CPC ....... *H01M 8/0267* (2013.01); *H01M 8/0273* (2013.01); *H01M 8/0286* (2013.01); *H01M 2004/8694* (2013.01)

(58) Field of Classification Search
    CPC ....... H01M 8/0286; H01M 2004/8694; H01M 8/2483; H01M 8/0297
    See application file for complete search history.

(56) References Cited

U.S. PATENT DOCUMENTS

| | | | |
|---|---|---|---|
| 2013/0209909 A1* | 8/2013 | Sugiura | H01M 8/2457 |
| | | | 429/434 |
| 2016/0006045 A1 | 1/2016 | Zillich et al. | |
| 2017/0012301 A1 | 1/2017 | Kraft et al. | |
| 2017/0141414 A1* | 5/2017 | Poirot-Crouvezier | ....................... |
| | | | H01M 8/026 |
| 2017/0279133 A1* | 9/2017 | Blunt | H01M 8/0202 |

\* cited by examiner

BIPOLAR PLATE FOR AN ELECTROCHEMICAL DEVICE

CROSS-REFERENCE TO RELATED APPLICATIONS

This application is a continuation application of PCT/EP2018/068571 filed on Jul. 9, 2018, which claims priority from German application number 10 2017 115 873.1, filed Jul. 14, 2017, which applications are hereby incorporated by reference in their entirety in this application.

FIELD OF DISCLOSURE

The present invention relates to a bipolar plate for an electrochemical device, which bipolar plate comprises at least one first bipolar plate layer and one second bipolar plate layer which are joined to each other by a weld seam arrangement, wherein a first flow field for a first fluid medium is formed on the first bipolar plate layer, a second flow field for a second fluid medium is formed on the second bipolar plate layer, and a flow field for a third fluid medium is formed between the first bipolar plate layer and the second bipolar plate layer, and wherein the first bipolar plate layer has a first medium passage opening for the first fluid medium, a fluid connecting channel between the first medium passage opening and the first flow field, a second medium passage opening for the second fluid medium and a third medium passage opening for the third fluid medium.

BACKGROUND

The electrochemical device in which such a bipolar plate is used is designed, for example, as a fuel cell stack or as an electrolyser and preferably comprises a stack of a plurality of electrochemical units which are consecutive along a stacking direction.

Such a bipolar plate has two sides which are each directed towards an adjacent electrochemical unit, namely an anode side and a cathode side.

As fluid medium on the anode side, the fuel gas for an adjacent electrochemical unit is supplied via a flow field associated with the fuel gas (also called distribution structure).

As fluid medium on the cathode side, an oxidant for a further adjacent electrochemical unit is supplied via an associated flow field (also called distribution structure).

A coolant can be conducted in the intermediate space between two or more than two bipolar plate layers of the bipolar plate, in what is referred to as the coolant flow field.

Through the medium passage openings in the bipolar plates, the fluid media are conducted parallel to the stacking direction in medium channels, from which the fluid media are supplied to the respectively associated flow fields via fluid connecting channels (also called gas ports or flow ports) and are conducted away out of the respectively associated flow fields into other medium channels which likewise run parallel to the stacking direction.

The coolant flow field has to be sealed off from the surroundings of the electrochemical device and from the chambers in which other fluid media are conducted.

For this purpose, the various bipolar plate layers of a bipolar plate are connected to one another by means of the weld seams of the weld seam arrangement in such a manner that the coolant cannot escape from the coolant flow field.

A weld seam is required around each of the medium channels associated with the anode-side flow field and the cathode-side flow field, said weld seam preventing the coolant from overflowing into said medium channels and—in the reverse direction—preventing anode-side fluid medium or cathode-side fluid medium from encroaching into the coolant flow field.

A weld seam is not provided between the coolant flow field and the medium channels for supplying coolant and conducting away coolant since the exchange of coolant between the coolant medium channels and the coolant flow field has to be ensured.

At the fluid connecting channels, through which the fluid media flow between the medium channels and the respectively associated flow fields, apertures can be provided in each case one of the bipolar plate layers of the bipolar plate in order to supply the fluid media to the respective flow field. Said apertures lie within the weld seam which surrounds the respective medium channel, as disclosed in DE 10 2014 104 017 A1.

Weld seams of the weld seam arrangement, which weld seams are welded in one welding step or in a plurality of welding steps, cross over one another at crossing points.

In a fusion welding method, in particular in a laser welding method, inlet regions and outlet regions in which the weld seam is produced with ramp profiles (in particular power ramps, speed ramps and/or focus ramps) in order to avoid the production of weld seam irregularities or at least to reduce the occurrence thereof are customarily provided at the weld seam beginning and at the weld seam end.

Such seam irregularities may comprise a seam collapse, holes, cavities, gouge marks, notches, microcracks, macrocracks, spatters, weld craters or the like.

Said seam irregularities may lead to a bipolar plate layer or a plurality of bipolar plate layers of the bipolar plate having leakages, and therefore media can be exchanged between the various media chambers adjacent to the leakage or with the surroundings of the electrochemical device.

In particular, seam irregularities frequently occur in the region of weld seam crossing points and weld seam ends.

SUMMARY OF THE INVENTION

The present invention is based on the object of providing a bipolar plate of the type mentioned at the beginning, in which seam irregularities occurring in the weld seam arrangement do not have any effect on the tightness between the media chambers and between the media chambers and the surroundings of the electrochemical device.

This object is achieved according to the invention in the case of a bipolar plate with the features of the preamble of Claim 1 in that the weld seam arrangement comprises a first medium channel weld seam which surrounds the first medium passage opening, a second medium channel weld seam which surrounds the second medium passage opening, and a connecting weld seam which crosses the first medium channel weld seam and the second medium channel weld seam, wherein a) the connecting weld seam is produced by means of a welding energy source which the first bipolar plate layer faced during the welding process, and the weld seam end of the connecting weld seam lies within the medium-conducting region of the bipolar plate which is surrounded by the first medium channel weld seam, and/or b) the connecting weld seam crosses the first medium channel weld seam and/or the second medium channel weld seam at least twice in each case.

The risk of leakages caused by weld seam irregularities in a bipolar plate layer is namely greater at a weld seam end than at a weld seam beginning and is greater in the first bipolar plate layer facing the welding energy source, in particular a laser, during the welding process than in the second bipolar plate layer which faces away from the welding energy source.

If the weld seam end of the connecting weld seam lies within the first medium-conducting region of the bipolar plate which is surrounded by the first medium channel weld seam, a leakage of the connecting weld seam in the region of the weld seam end in the first bipolar plate layer facing the welding energy source namely then only has the result that the first fluid medium (for example, the oxidant) passes out of said first medium-conducting region into the first flow field on the first bipolar plate layer where the first fluid medium can in any case pass through the fluid connecting channel between the first medium-conducting region and the first flow field.

Owing to the fact that the weld seam end of the connecting weld seam is placed in the first medium-conducting region, an escape of the first fluid medium into a chamber not provided for said medium is therefore avoided.

Alternatively or additionally thereto, the object on which the invention is based is achieved in that the connecting weld seam crosses the first medium channel weld seam and/or the second medium channel weld seam at least twice in each case, and therefore the weld seam end lies outside the first medium-conducting region of the bipolar plate which is surrounded by the first medium channel weld seam, and/or the weld seam beginning lies outside the second medium-conducting region of the bipolar plate which is surrounded by the second medium channel weld seam.

The effect achieved by this is that possible leakages because of weld seam irregularities in the region of the weld seam end or the weld seam beginning of the connecting weld seam do not result in fluid medium escaping through the connecting weld seam in question.

It is preferably provided here that the weld seam end and/or the weld seam beginning of the connecting weld seam also lie/lies outside a region of the bipolar plate which is surrounded by a flow field sealing line of a sealing arrangement of the bipolar plate.

The number of crossing points at which the connecting weld seam crosses the first medium channel weld seam and/or the number of crossing points at which the connecting weld seam crosses the second medium channel weld seam are/is preferably an even number (two, four, . . . ).

The connecting weld seam is preferably a laser weld seam.

The connecting weld seam preferably runs at least in sections around the third medium passage opening (for example, a coolant passage opening).

In a preferred refinement of the invention, it is provided that the first bipolar plate layer has a sealing arrangement with a flow field sealing line which surrounds the first flow field, wherein the weld seam beginning of the connecting weld seam and/or the weld seam end of the connecting weld seam lie/lies within that region of the bipolar plate which is surrounded by the flow field sealing line of the sealing arrangement.

In principle, the first bipolar plate layer, which faces the welding energy source during the welding process, can be a cathode-side bipolar plate layer or an anode-side bipolar plate layer of the bipolar plate.

In a preferred refinement of the invention, it is provided that the first bipolar plate layer is a cathode-side bipolar plate layer of the bipolar plate.

The third fluid medium is preferably a coolant, by means of which the electrochemical device is coolable during the operation thereof.

In a preferred refinement of the invention, it is provided that a weld seam end and/or a weld seam beginning of the first medium channel weld seam lie/lies outside the first medium-conducting region of the bipolar plate which is surrounded by the first medium channel weld seam, and/or that a weld seam end and/or a weld seam beginning of the second medium channel weld seam lie/lies outside the second medium-conducting region of the bipolar plate which is surrounded by the second medium channel weld seam.

It is thereby also avoided that weld seam irregularities in the region of the weld seam ends and/or the weld seam beginnings of the first medium channel weld seam or of the second medium channel weld seam lead to an undesirable escape of fluid media out of the first medium-conducting region or out of the second medium-conducting region of the bipolar plate.

The weld seam beginning of the connecting weld seam preferably lies within the second medium-conducting region of the bipolar plate which is surrounded by the second medium channel weld seam.

Alternatively thereto, it can be provided that the connecting weld seam crosses the second medium channel weld seam at least twice, and therefore the weld seam beginning lies outside the second medium-conducting region of the bipolar plate which is surrounded by the second medium channel weld seam.

The number of crossing points at which the connecting weld seam crosses the second medium channel weld seam is preferably an even number (two, four, . . . ).

Since weld seam irregularities occur particularly frequently in the region of the weld seam ends and the weld seam beginnings, it is provided, in preferred refinements of the invention, that the weld seam end of the connecting weld seam has a spacing S of at least 0.1 mm, in particular of at least 0.5 mm, particularly preferably of at least 1.0 mm, from the closest crossing point between the connecting weld seam and the first medium channel weld seam, and/or that the weld seam beginning of the connecting weld seam has a spacing S' of at least 0.1 mm, in particular of at least 0.5 mm, particularly preferably of at least 1.0 mm, from the crossing point between the connecting weld seam and the second medium channel weld seam.

Furthermore, it is preferably provided that the weld seam end and/or the weld seam beginning of the first medium channel weld seam have/has a spacing S" or S'" from the crossing point at which the first medium channel weld seam crosses itself.

In a corresponding manner, it is favorable if the weld seam end and/or the weld seam beginning of the second medium channel weld seam have/has a spacing S" or S'" from the crossing point at which the second medium channel weld seam crosses itself.

Furthermore, it is favorable if the weld seam end and/or the weld seam beginning of the first medium channel weld seam are/is arranged outside the first medium-conducting region of the bipolar plate which is surrounded by the first medium channel weld seam.

In a corresponding manner, it is favorable if the weld seam end and/or the weld seam beginning of the second medium channel weld seam are/is arranged outside the second medium-conducting region of the bipolar plate which is surrounded by the second medium channel weld seam.

The bipolar plate according to the invention is suitable in particular for use in an electrochemical device which comprises a plurality of electrochemical units which are consecutive along a stacking direction, wherein at least one of the electrochemical units comprises a bipolar plate according to the invention.

The present invention furthermore relates to a method for producing a bipolar plate for an electrochemical device, which bipolar plate comprises at least one first bipolar plate layer and one second bipolar plate layer, wherein a first flow field for a first fluid medium is formed on the first bipolar plate layer, a second flow field for a second fluid medium is formed on the second bipolar plate layer and a third flow field for a third fluid medium is formed between the first bipolar plate layer and the second bipolar plate layer, and wherein the first bipolar plate layer has a first medium passage opening for the first fluid medium, a fluid connecting channel between the first medium passage opening and the first flow field, a second medium passage opening for the second fluid medium and a third medium passage opening for the third fluid medium.

The present invention is based on the further object of providing such a method for producing a bipolar plate, by means of which method a bipolar plate is produced in which weld seam irregularities do not have any effect on the tightness between the media chambers and between the media chambers and the surroundings of the electrochemical device.

This object is achieved according to the invention by a method according to Claim 14, wherein the method comprises the following:

producing a weld seam arrangement, by means of which the first bipolar plate layer and the second bipolar plate layer are joined to each other, by means of a welding energy source, wherein the weld seam arrangement comprises a first medium channel weld seam which surrounds the first medium passage opening, a second medium channel weld seam which surrounds the second medium passage opening, and a connecting weld seam which crosses the first medium channel weld seam and the second medium channel weld seam, and wherein a) the first bipolar plate layer faces the welding energy source during the welding process, and the formation of the connecting weld seam is ended at a weld seam end which is arranged within the first medium-conducting region which is surrounded by the first medium channel weld seam, and/or b) the connecting weld seam is formed in such a manner that it crosses the first medium channel weld seam and/or the second medium channel weld seam at least twice in each case.

The advantages of the two alternatives a) and b) of the method according to the invention have already been explained above in conjunction with the alternatives a) and b) of the bipolar plate according to the invention.

Similarly, advantageous refinements of the method according to the invention have already been explained above in conjunction with particular refinements of the bipolar plate according to the invention.

The bipolar plate layers are preferably composed of a metallic material or of a material based on plastics, for example of a thermoplastic material.

In addition to the first bipolar plate layer and the second bipolar plate layer, the bipolar plate can also comprise one or more intermediate layers which are preferably arranged between the first bipolar plate layer and the second bipolar plate layer.

Further features and advantages of the invention are the subject matter of the description below and the graphical illustration of exemplary embodiments.

Identical or functionally equivalent elements are denoted by the same reference signs in all of the figures.

DETAILED DESCRIPTION OF THE INVENTION

Figure 1:
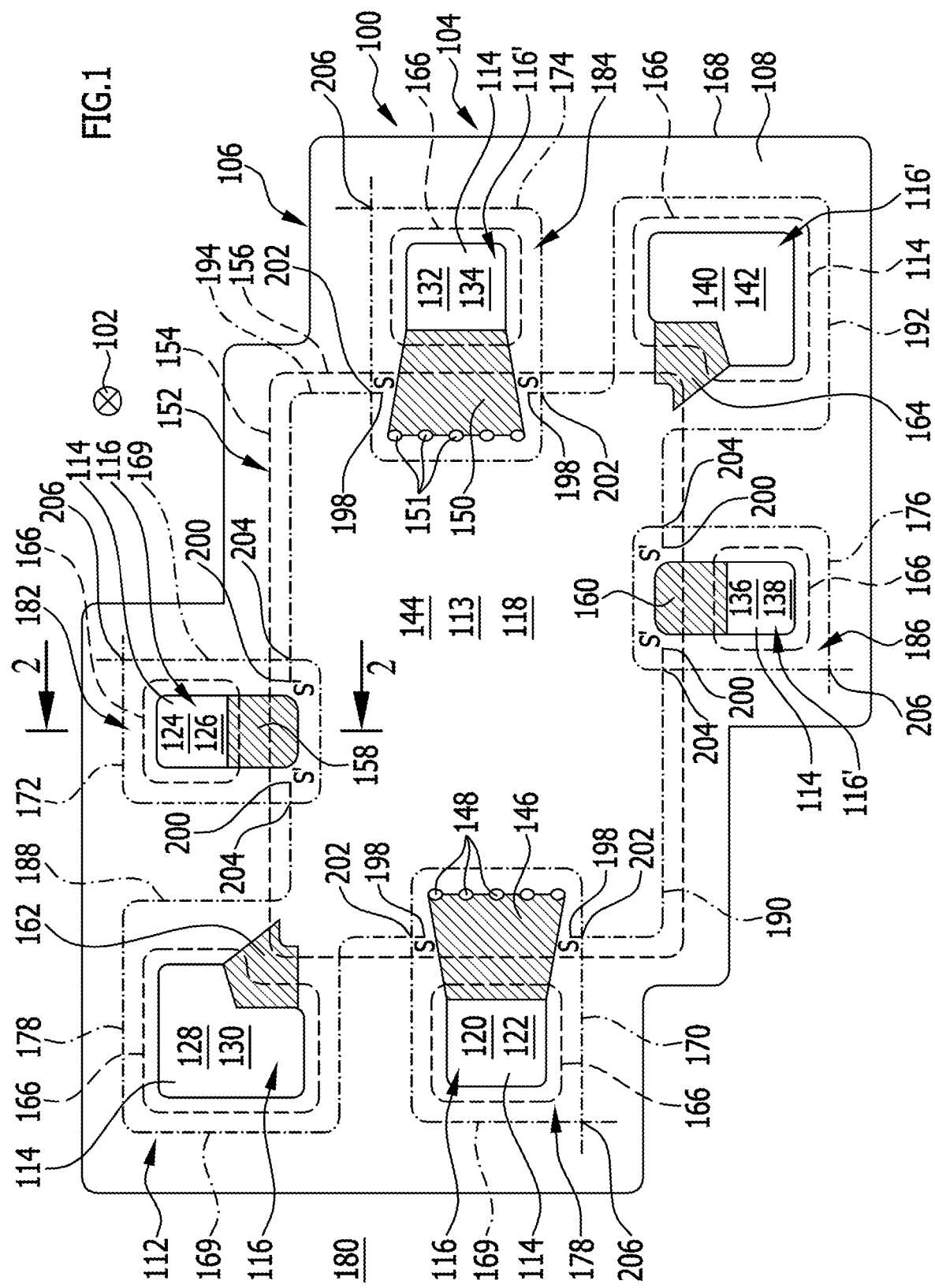
FIG. 1 shows a schematic top view of a bipolar plate for an electrochemical device, specifically of a first bipolar plate layer of the bipolar plate with a first flow field for a first fluid medium.
Figure 2:
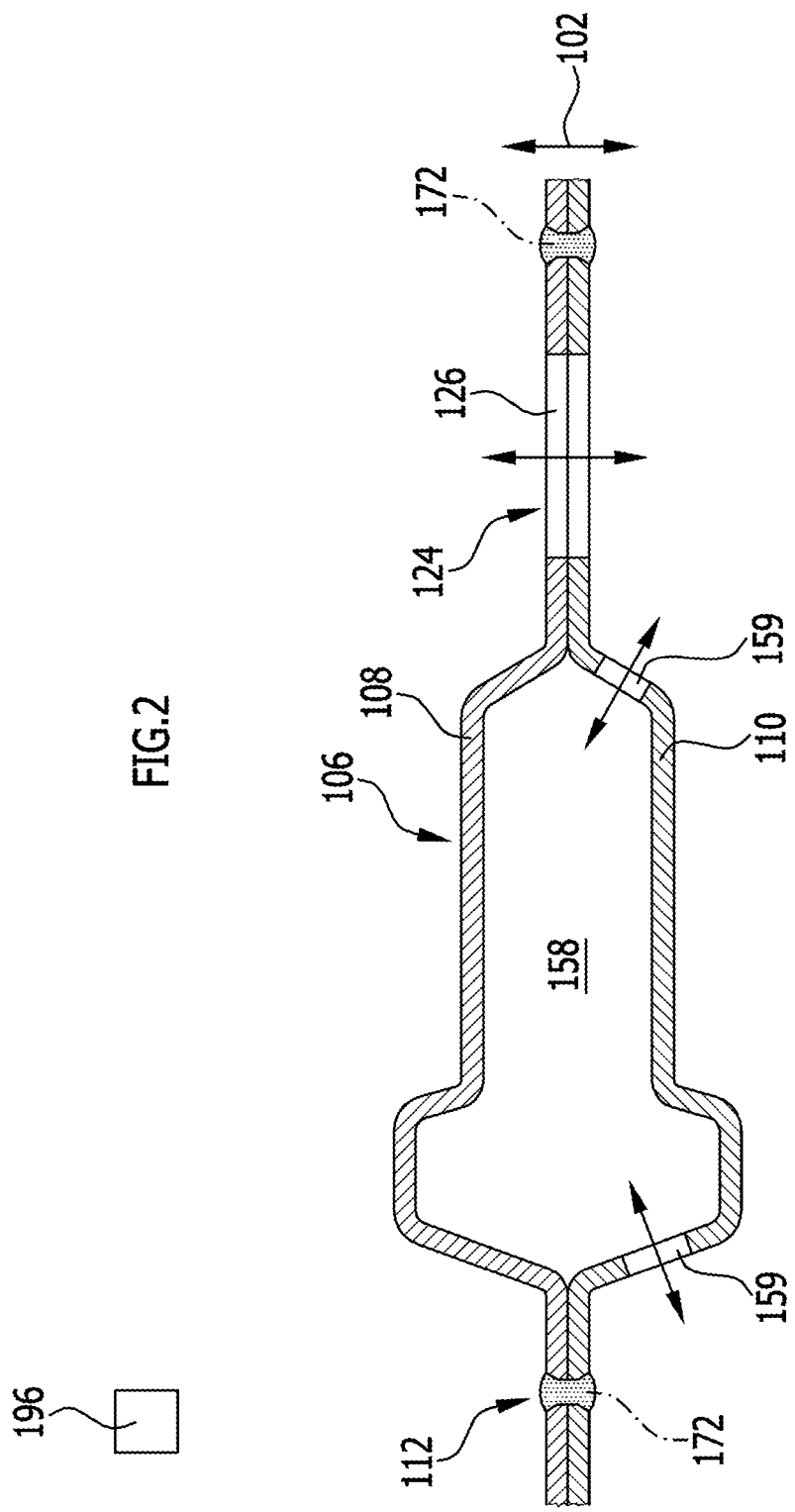
FIG. 2 shows a partial cross section through the bipolar plate from FIG. 1, along the line 2-2 in FIG. 1.

An electrochemical device, for example a fuel cell stack or an electrolyser, which is partially illustrated in FIGS. 1 and 2 and is denoted as a whole by 100, comprises a stack which comprises a plurality of electrochemical units 104, for example fuel cell units or electrolysis units, which are consecutive in a stacking direction 102, and a clamping device (not illustrated) for acting upon the electrochemical units 104 with a clamping force directed parallel to the stacking direction 102.

Each of the electrochemical units 104 of the electrochemical device 100 in each case comprises a bipolar plate 106.

In this embodiment, each bipolar plate 106 comprises a first bipolar plate layer 108 and a second bipolar plate layer 110 which are fixed in a fluid-tight manner to each other by a weld seam arrangement 112.

One or more intermediate layers of the bipolar plate 106 can be arranged between the first bipolar plate layer 108 and the second bipolar plate layer 110.

A coolant flow field 113 is formed in an intermediate space (not illustrated in the drawings) between the first bipolar plate layer 108 and the second bipolar plate layer 110.

The bipolar plate 106 is preferably formed from a metallic material or from a plastics material, in particular from a thermoplastic material.

Each bipolar plate 106 has a plurality of medium passage openings 114 through which a fluid medium (for example, a fuel gas, an oxidant or a coolant in the case of a fuel cell stack) to be supplied to the electrochemical device 100 can in each case pass through the bipolar plate 106.

The medium passage openings 114 of the bipolar plates 106, which are consecutive in the stack, and the intermediate spaces lying in the stacking direction 102 between the medium passage openings 114 together form a medium channel 116 in each case.

Such a medium channel 116 is frequently also called a manifold.

Each medium channel 116 through which a fluid medium is suppliable to the electrochemical device 100 is in each case associated with at least one other medium channel 116' through which the fluid medium concerned is removable from the electrochemical device.

The medium can flow out of the supply medium channel 116 transversely, preferably substantially perpendicularly, with respect to the stacking direction to the removal medium channel 116' through a flow field 118 which lies inbetween and is formed on the surface of one of the bipolar plate layers 108, 110 or (in the case of the coolant flow field 113) in the intermediate space between the bipolar plate layers 108, 110.

FIG. 1 illustrates, for example, a first medium channel 120 with a first medium passage opening 122 for the supply of a first fluid medium (for example, an oxidant), a second medium channel 124 with a second medium passage opening 126 for the supply of a second fluid medium (for example, a fuel gas), a third medium channel 128 with a third medium passage opening 130 for the supply of a third fluid medium (for example, a coolant), a fourth medium channel 132 with a fourth medium passage opening 134 for the removal of the first fluid medium (for example, the unused oxidant or cathode exhaust gas), a fifth medium channel 136 with a medium passage opening 138 for the removal of the second fluid medium (for example, the unused fuel gas or the anode exhaust gas) and a sixth medium channel 140 with a sixth medium passage opening 142 for the removal of the third fluid medium (for example, the coolant).

Furthermore, the first bipolar plate layer 108 which faces the viewer in FIG. 1, for example the cathode-side bipolar plate layer, comprises a first flow field 144 for the first fluid medium (for example, the oxidant or the cathode exhaust gas).

The first flow field 144 is fluidically connected to the first medium channel 120 and the first medium passage opening 122 via a fluid connecting channel 146 which comprises fluid passage openings 148 on the first bipolar plate layer 108.

Furthermore, the first flow field 144 is fluidically connected to the fourth medium channel 132 and the fourth medium passage opening 134 via a fluid connecting channel 150 which comprises fluid passage openings 151 in the first bipolar plate layer 108.

The first fluid medium can therefore pass out of the first medium channel 120 through the fluid connecting channel 146 into the first flow field 144 and can pass out of the first flow field 144 through the fluid connecting channel 150 into the fourth medium channel 132.

In a corresponding manner, the second fluid medium can pass out of the second medium channel 124 through a fluid connecting channel 158, which comprises fluid passage openings on the second bipolar plate layer 110, into a second flow field for the second fluid medium (for example, the fuel gas or the anode exhaust gas) on the second bipolar plate layer 110 and from there through a fluid connecting channel 160 into the fifth medium channel 136.

The third fluid medium (for example, the coolant) can pass through a fluid connecting channel 162, which is formed between the two bipolar plate layers 108 and 110, into a third flow field (for example, the coolant flow field 113), which is formed between the bipolar plates 108, 110, and from there through a fluid connecting channel 164 into the sixth medium channel 140.

An undesirable escape of the fluid media out of the medium channels 116, out of the first flow field 144 on the first bipolar plate layer 108 and out of a second flow field (not illustrated) on the second bipolar plate layer 110 is avoided by a sealing arrangement 152, the sealing lines 154 of which are illustrated by broken lines in the top view of FIG. 1.

The sealing arrangement 152 comprises a flow field sealing line 156 which surrounds the first flow field 144 and crosses the fluid connecting channels 146 and 150.

The sealing arrangement 152 furthermore comprises medium channel sealing lines 166 which each surround one of the medium channels 116 at least in sections, preferably completely, and separate the medium channel 116 concerned from an outer edge 168 of the bipolar plate 106.

The sealing lines 154 of the sealing arrangement 152 are provided on sealing elements (not illustrated) which are arranged on the mutually inverted outer sides of the bipolar plate layers 108, 110.

Said sealing element can be configured, for example, in the form of sealing beads made from an elastomer material.

An undesirable escape of the third fluid medium from the third flow field which is formed between the bipolar plate layers 108, 110 is prevented by the weld seam arrangement 112, by means of which the bipolar plate layers 108, 110 are fixed to each other.

The weld seams 169 of the weld seam arrangement 112 are illustrated as chain-dotted lines in the top view of FIG. 1.

The weld seam arrangement 112 comprises a first medium channel weld seam 170 which surrounds the first medium passage opening 122 and the fluid connecting channel 146, a second medium channel weld seam 172 which surrounds the second medium passage opening 126 and the fluid connecting channel 158, a third medium channel weld seam 174 which surrounds the fourth medium passage opening 134 and the fluid connecting channel 150, and a fourth medium channel weld seam 176 which surrounds the fifth medium passage opening 138 and the fluid connecting channel 160.

The first medium channel weld seam 170 encloses a first medium-conducting region 178 which is sealed off from the third flow field (coolant flow field 113) and from the exterior space 180 of the bipolar plate 106 by the first medium channel weld seam 170.

The second medium channel weld seam 172 encloses a second medium-conducting region 182 which seals off the second medium channel weld seam 172 from the third flow field (coolant flow field 113) and from the exterior space 180 of the bipolar plate 106.

The third medium channel weld seam 174 encloses a third medium-conducting region 184 which seals off the third medium channel weld seam 174 from the third flow field (coolant flow field 113) and from the exterior space 180 of the bipolar plate 106.

The fourth medium channel weld seam 176 encloses a fourth medium-conducting region 186 which seals off the fourth medium channel weld seam 176 from the third flow field (coolant flow field 113) and from the exterior space 180 of the bipolar plate 106.

The weld seam arrangement 112 furthermore comprises a first connecting weld seam 188 which leads from the second medium-conducting region 182 to the first medium-conducting region 178.

The first connecting weld seam 188 runs here on that side of the third medium passage opening 130 which faces away from the third flow field (coolant flow field 113), and therefore the first connecting weld seam 188 leaves free the passage from the third medium channel 128 into the third flow field (coolant flow field 113).

Furthermore, the weld seam arrangement 112 comprises a second connecting weld seam 190 which leads from the fourth medium-conducting region 186 into the first medium-conducting region 178 and thus prevents the third fluid medium from exiting from the third flow field (coolant flow field 113) into the exterior space 180 of the bipolar plate 106.

The weld seam arrangement 112 furthermore comprises a third connecting weld seam 192 which leads from the fourth medium-conducting region 186 into the third medium-conducting region 184.

The third connecting weld seam 192 runs here on that side of the sixth medium passage opening 142 which faces away from the third flow field (coolant flow field 113), and therefore the third connecting weld seam 192 leaves free the passage from the third flow field (coolant flow field 113) into the sixth medium channel 140.

Furthermore, the weld seam arrangement 112 comprises a fourth connecting weld seam 194 which leads from the second medium-conducting region 182 into the third medium-conducting region 184. Said fourth connecting weld seam 194 therefore prevents the third fluid medium from exiting from the third flow field (coolant flow field 113).

The weld seams 169 of the weld seam arrangement 112 are produced by means of a welding energy source 196 which, during the welding process, is arranged on that side of the bipolar plate 106 which faces away from the second bipolar plate layer 110, as illustrated schematically in FIG. 2. During the welding operation, the first bipolar plate layer 108 therefore faces the welding energy source 196.

The welding energy source 196 can be in particular a laser which produces a laser beam for producing the weld seams 169 by means of laser welding.

During a laser welding operation, irregularities in the weld seams 169 which are produced, for example seam collapses, holes, cavities, gouge marks, notches, microcracks, macrocracks, etc., may occur depending on boundary conditions, in particular on the material properties, geometries, inherent stresses and manufacturing tolerances of the bipolar plate layers 108, 110, on the component clamping, the process parameters and/or the quality of the laser welding device.

Said seam defects may lead to one of the bipolar plate layers 108, 110 or both bipolar plate layers 108, 110 having leakages and therefore to media being able to be exchanged between the media-conducting regions, which are to be sealed off by the weld seams 169, and the surroundings of said regions.

The risk of such leakages, which are caused by weld seam irregularities, in a bipolar plate layer 108, 110 is greater at a weld seam end 198 than at a weld seam beginning 200 and is greater in the first bipolar plate layer 108, which faces the welding energy source 196, in particular the laser, during the welding process, than in the second bipolar plate layer 110, which faces away from the welding energy source 196.

The first connecting weld seam 188 is therefore preferably produced in such a manner that the weld seam beginning 200 lies in the second medium-conducting region 182 and the weld seam end 198 lies in the first medium-conducting region 178.

A leakage of the first connecting weld seam 188 in the region of the weld seam end 198 in the first bipolar plate layer 108 facing the welding energy source 196 namely then merely has the result that the first fluid medium (for example, the oxidant) passes out of the first medium-conducting region 178 into the first flow field 144 on the first bipolar plate layer 108 where the first fluid medium can in any case pass through the fluid connecting channel 146.

As a result of the fact that the weld seam end 198 is placed in the first medium-conducting region 178, an escape of the first fluid medium into a space not provided for said medium is therefore avoided.

Furthermore, the weld seam end 198 is preferably placed in such a manner that it lies within that region of the bipolar plate 106 which is enclosed by the flow field sealing line 156 of the sealing arrangement 152.

The weld seam beginning 200 of the first connecting weld seam 188 is preferably also placed in such a manner that it lies within that region of the bipolar plate 106 which is enclosed by the flow field sealing line 156 of the sealing arrangement 152.

The second connecting weld seam 190 is preferably produced in such a manner that the weld seam beginning 200 lies within the fourth medium-conducting region 186 and within that region of the bipolar plate 106 which is enclosed by the flow field sealing line 156, and that the weld seam end 198 lies within the first medium-conducting region 178 and within that region of the bipolar plate 106 which is enclosed by the flow field sealing line 156 of the sealing arrangement 152.

The third connecting weld seam 192 is preferably produced in such a manner that the weld seam beginning 200 lies within the fourth medium-conducting region 186 and within that region of the bipolar plate 106 which is enclosed by the flow field sealing line 156 of the sealing arrangement 152, and that the weld seam end 198 lies within the third medium-conducting region 184 and within that region of the bipolar plate 106 which is enclosed by the flow field sealing line 156 of the sealing arrangement 152.

The fourth connecting weld seam 194 is preferably produced in such a manner that the weld seam beginning 200 lies within the second medium-conducting region 182 and within that region of the bipolar plate 106 which is enclosed by the flow field sealing line 156 of the sealing arrangement 152, and that the weld seam end 198 lies within the third medium-conducting region 184 and within that region of the bipolar plate 106 which is enclosed by the flow field sealing line 156 of the sealing arrangement 152.

Furthermore, the connecting weld seams 188, 190, 192 and 194 are preferably produced in such a manner that the weld seam end 198 is spaced apart by a spacing S, which is at least 0.1 mm, from the crossing point 202 at which the respective connecting weld seam 188, 190, 192, 194 crosses the first medium channel weld seam 170 or the third medium channel weld seam 174.

Furthermore, the connecting weld seams 188, 190, 192, 194 are preferably produced in such a manner that the weld seam beginnings 200 are spaced apart by a spacing S', which is at least 0.1 mm, from the crossing point 204 at which the respective connecting weld seam 188, 190, 192, 194 crosses the second medium channel weld seam 172 or the fourth medium channel weld seam 176.

The spacings S and S' can be substantially equal in size.

The spacings S and/or S' can be in particular at least 0.5 mm.

Furthermore, it is preferably provided that the spacings S and/or S' are at most 10 mm, in particular at most 2 mm.

The medium channel weld seams 170, 172, 174 and 176 are enclosed on themselves.

In particular, said medium channel weld seams cross themselves at a respective crossing point 206.

Figure 3:
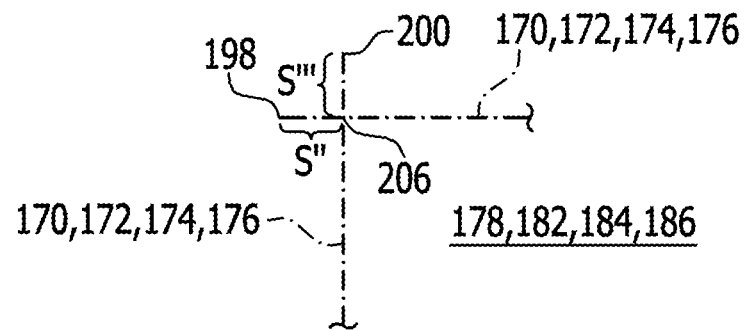
FIG. 3 shows a schematic illustration of two weld seams which cross each other.

The crossing over here is designed in such a manner that both the weld seam beginning 200 and the weld seam end 198 lie outside the medium-conducting region 178, 182, 184 or 186 enclosed by the relevant medium channel weld seam 170, 172, 174, 176 (see FIG. 3).

The medium channel weld seams 170, 172, 174 and 176 are preferably produced in such a manner that the weld seam end 198 is spaced apart by a spacing S", which is at least 0.1 mm, from the crossing point 206 at which the respective medium channel weld seam 170, 172, 174, 176 crosses over itself.

Furthermore, the medium channel weld seams 170, 172, 174 and 176 are preferably produced in such a manner that the weld seam beginning 200 is spaced apart by a spacing S''', which is at least 0.1 mm, from the crossing point 206 at which the respective medium channel weld seam 170, 172, 174 or 176 crosses over itself.

The spacings S" and S''' can be substantially identical in size.

The spacings S" and/or S''' can be in particular at least 0.5 mm.

Furthermore, it is preferably provided that the spacings S" and/or S''' are at most 10 mm, in particular at most 2 mm.

By means of this configuration of the medium channel weld seams 170, 172, 174 and 176, it is ensured that the weld seam end 198 and/or the weld seam beginning 200 of the relevant medium channel weld seam 170, 172, 174, 176 lies outside the medium-conducting region 178, 182, 184 or 186 which is sealed off from the weld seam.

Leakages because of weld seam irregularities in the region of the weld seam end 198 or in the region of the weld seam beginning 200 therefore cannot lead to an escape of fluid medium out of the respective medium-conducting region 178, 182, 184 or 186.

Figure 4:
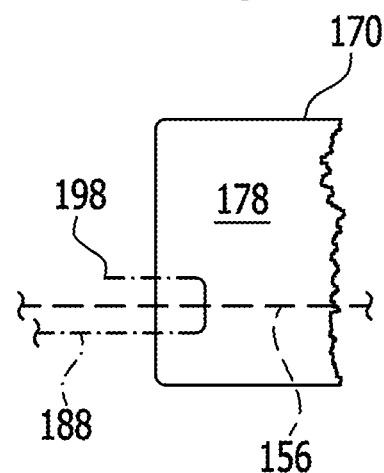
FIG. 4 shows a schematic illustration of a first weld seam which bounds a medium region to be sealed off, and a second weld seam which crosses the first weld seam, has a portion running within the medium region to be sealed off by the first weld seam, crosses the first weld seam again and ends outside the medium region to be sealed off by the first weld seam.

A second embodiment, which is partially illustrated in FIG. 4, of a bipolar plate 106 differs from the first embodiment illustrated in FIGS. 1 to 3 in that, in the case of at least one of the connecting weld seams 188, 190, 192 and 194, the weld seam end 198 does not lie within the first medium-conducting region 178 or the third medium-conducting region 184, but rather the respective connecting weld seam 188, 190, 192, 194 crosses the respectively associated medium channel weld seam 170 or 174 twice, and therefore the weld seam end 198 lies outside the medium-conducting region 178 or 184 which is surrounded by the respective medium channel weld seam 170 or 174, and outside that region of the bipolar plate 106 which is surrounded by the flow field sealing line 156 of the sealing arrangement 152.

The effect achieved by this is that possible leakages due to weld seam irregularities in the region of the weld seam end 198 do not lead to fluid medium escaping through the relevant connecting weld seam 188, 190, 192 or 194.

Figure 5:
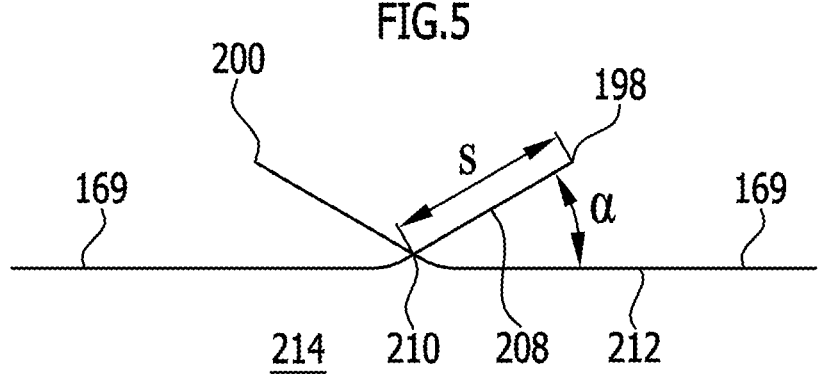
FIG. 5 shows a schematic illustration of two weld seams which cross each other, wherein the ends of the weld seams have a spacing S from the crossing point of the weld seams, and end portions of the weld seams, said end portions leading to the ends of the weld seams, enclosing an angle α with a portion of the other weld seam in each case, said portion leading to the crossing point.

FIG. 5 schematically shows an overlapping of two weld seams 169, in which a weld seam portion 208 of the one weld seam 169, which weld seam portion leads from the weld seam end 198 to the crossing point 210 at which the two weld seams 208 cross each other, has a length S and encloses an angle α with a weld seam portion 212 of the other weld seam 169, which weld seam portion is arranged on that side of the crossing point 210 which faces away from the weld seam beginning 200 of said weld seam 169.

The angle α is preferably within the range of more than 0° to 90°.

The spacing S is preferably at least 0.1 mm, in particular at least 0.5 mm, and/or preferably at most 10 mm, in particular at most 2 mm.

The weld seam beginning 200 and the weld seam end 198 lie outside the medium-conducting region 214 of the bipolar plate 106, which region is sealed off by the welding lines.

Alternatively to the embodiment illustrated in FIG. 5, the weld seam end 198 can also be a weld seam beginning 200, and/or the weld seam beginning 200 can be a weld seam end 198.

If, during the welding process, rather than acting on the bipolar plate layers 108, 110 from the side of the first bipolar plate layer 108, the welding energy source 196 acts from the side of the second bipolar plate layer 110, the production directions of the connecting weld seams 188, 190, 192 and 194 are preferably changed in such a manner that the layers of the weld seam ends 198 and of the weld seam beginnings 200 of said connecting weld seams 188, 190, 192 and 194 are swapped with each other in relation to the position described above and illustrated in the drawings.

The invention claimed is:

1. A bipolar plate for an electrochemical device, comprising at least one first bipolar plate layer and one second bipolar plate layer which are joined to each other by a weld seam arrangement, wherein a first flow field for a first fluid medium is formed on the first bipolar plate layer, a second flow field for a second fluid medium is formed on the second bipolar plate layer, and a flow field for a third fluid medium is formed between the first bipolar plate layer and the second bipolar plate layer, and wherein the first bipolar plate layer has a first medium passage opening for the first fluid medium, a fluid connecting channel between the first medium passage opening and the first flow field, a second medium passage opening for the second fluid medium and a third medium passage opening for the third fluid medium, wherein the weld seam arrangement comprises a first medium channel weld seam which surrounds the first medium passage opening, a second medium channel weld seam which surrounds the second medium passage opening, and a connecting weld seam which crosses the first medium channel weld seam and the second medium channel weld seam, wherein a) the connecting weld seam is produced by a welding energy source which the first bipolar plate layer faced during the welding process, and the weld seam end of the connecting weld seam lies within the medium-conducting region of the bipolar plate which is surrounded by the first medium channel weld seam, and/or b) the connecting weld seam crosses the first medium channel weld seam and/or the second medium channel weld seam at least twice in each case.

2. The bipolar plate according to claim 1, wherein the connecting weld seam is a laser weld seam.

3. The bipolar plate according to claim 1, wherein the connecting weld seam runs at least in sections around the third medium passage opening.

4. The bipolar plate according to claim 1, wherein the first bipolar plate layer has a sealing arrangement with a flow field sealing line which surrounds the first flow field, wherein the weld seam beginning of the connecting weld seam and/or the weld seam end of the connecting weld seam lie/lies within that region of the bipolar plate which is surrounded by the flow field sealing line of the sealing arrangement.

5. The bipolar plate according to claim 1, wherein the first bipolar plate layer is a cathode-side bipolar plate layer of the bipolar plate.

6. The bipolar plate according to claim 1, wherein the third fluid medium is a coolant.

7. The bipolar plate according to claim 1, wherein a weld seam end and/or a weld seam beginning of the first medium channel weld seam lie/lies outside the first medium-conducting region of the bipolar plate which is surrounded by the first medium channel weld seam, and/or a weld seam end and/or a weld seam beginning of the second medium channel weld seam lie/lies outside the second medium-conducting region of the bipolar plate which is surrounded by the second medium channel weld seam.

8. The bipolar plate according to claim 1, wherein the weld seam beginning of the connecting weld seam lies within the second medium-conducting region of the bipolar plate which is surrounded by the second medium channel weld seam.

9. The bipolar plate according to claim 1, wherein the connecting weld seam crosses the second medium channel weld seam at least twice.

10. The bipolar plate according to claim 1, wherein the weld seam end of the connecting weld seam has a spacing of at least 0.1 mm from the closest crossing point between the connecting weld seam and the first medium channel weld seam, and/or the weld seam beginning of the connecting weld seam has a spacing of at least 0.1 mm from the crossing point between the connecting weld seam and the second medium channel weld seam.

11. The bipolar plate according to claim 1, wherein the weld seam end and/or the weld seam beginning of the first medium channel weld seam have/has a spacing from the crossing point at which the first medium channel weld seam crosses itself.

12. The bipolar plate according to claim 1, wherein the weld seam end and/or the weld seam beginning of the first medium channel weld seam are/is arranged outside the first medium-conducting region of the bipolar plate which is surrounded by the first medium channel weld seam.

13. An electrochemical device, comprising a plurality of electrochemical units which are consecutive along a stacking direction, wherein at least one of the electrochemical units comprises:
    a bipolar plate, comprising at least one first bipolar plate layer and one second bipolar plate layer which are joined to each other by a weld seam arrangement,
    wherein a first flow field for a first fluid medium is formed on the first bipolar plate layer, a second flow field for a second fluid medium is formed on the second bipolar plate layer, and a flow field for a third fluid medium is formed between the first bipolar plate layer and the second bipolar plate layer, and
    wherein the first bipolar plate layer has a first medium passage opening for the first fluid medium, a fluid connecting channel between the first medium passage opening and the first flow field, a second medium passage opening for the second fluid medium and a third medium passage opening for the third fluid medium,
    wherein the weld seam arrangement comprises a first medium channel weld seam which surrounds the first medium passage opening, a second medium channel weld seam which surrounds the second medium passage opening, and a connecting weld seam which crosses the first medium channel weld seam and the second medium channel weld seam,
    wherein
    a) the connecting weld seam is produced by a welding energy source which the first bipolar plate layer faced during the welding process, and the weld seam end of the connecting weld seam lies within the medium-conducting region of the bipolar plate which is surrounded by the first medium channel weld seam,
    and/or
    b) the connecting weld seam crosses the first medium channel weld seam and/or the second medium channel weld seam at least twice in each case.

14. A method for producing a bipolar plate for an electrochemical device, which bipolar plate comprises at least one first bipolar plate layer and one second bipolar plate layer, wherein a first flow field for a first fluid medium is formed on the first bipolar plate layer, a second flow field for a second fluid medium is formed on the second bipolar plate layer and a third flow field for a third fluid medium is formed between the first bipolar plate layer and the second bipolar plate layer, and
    wherein the first bipolar plate layer has a first medium passage opening for the first fluid medium, a fluid connecting channel between the first medium passage opening and the first flow field, a second medium passage opening for the second fluid medium and a third medium passage opening for the third fluid medium,
    wherein the method comprises the following:
        producing a weld seam arrangement, by which the first bipolar plate layer and the second bipolar plate layer are joined to each other, by a welding energy source, wherein the weld seam arrangement comprises a first medium channel weld seam which surrounds the first medium passage opening, a second medium channel weld seam which surrounds the second medium passage opening, and a connecting weld seam which crosses the first medium channel weld seam and the second medium channel weld seam, and
    wherein
    a) the first bipolar plate layer faces the welding energy source during the welding process, and the formation of the connecting weld seam is ended at a weld seam end which is arranged within the first medium-conducting region which is surrounded by the first medium channel weld seam,
    and/or
    b) the connecting weld seam is formed in such a manner that it crosses the first medium channel weld seam and/or the second medium channel weld seam at least twice in each case.

* * * * *